United States Patent

Kimura et al.

Patent Number: 5,537,902
Date of Patent: Jul. 23, 1996

[54] ANTI-BREAKAGE CONFIGURATION FOR APPARATUS CUTTING THREADED RODS

[75] Inventors: Kiyoshi Kimura, Fujisawa; Eisuke Oide, Yokohama, both of Japan

[73] Assignee: Kabushiki Kaisah Ogura, Kanagawa-ken, Japan

[21] Appl. No.: 417,278

[22] Filed: Apr. 5, 1995

Related U.S. Application Data

[63] Continuation of Ser. No. 182,330, Jan. 18, 1994, abandoned.

[51] Int. Cl.$^6$ ........................................................ B26B 15/00
[52] U.S. Cl. ............................................. 83/13; 30/228
[58] Field of Search ............................ 30/226, 228, 233, 30/180, 360, 361, 90.2, 90.3; 83/603, 13

[56] References Cited

U.S. PATENT DOCUMENTS

| | | | |
|---|---|---|---|
| 3,089,241 | 5/1963 | Batdorf | 30/226 |
| 3,107,424 | 10/1963 | Stackawicz | 30/90.3 |
| 3,495,331 | 2/1970 | Riggs | 30/233 |
| 3,550,274 | 12/1970 | Temple et al. | 30/228 |
| 3,568,314 | 3/1971 | Adams | 30/90.2 |
| 4,722,257 | 2/1988 | Deon et al. | |

*Primary Examiner*—Douglas D. Watts
*Attorney, Agent, or Firm*—Dickstein, Shapiro, Morin

[57] ABSTRACT

A portable, power-driven machine for cutting a threaded rod to any required length by forcing a blade punch into a die cavity. The die has a series of semicircular internal threads which extends across the die cavity and which mates with the thread on the threaded rod in order to protect the latter from being ruined by cutting. The internal threads on the die have a depth less than the depth of the thread on the threaded rod, and clearances are provided between the flanks of the die thread flanks and those of the thread on the threaded rod, so that the die contacts the threaded rod only between the roots of the threads on the die and the crests of the thread on the threaded rod, in order to prevent those of the die threads which are located next to the die cavity, from being ruined by the impact of cutting.

5 Claims, 5 Drawing Sheets

ANTI-BREAKAGE CONFIGURATION FOR APPARATUS CUTTING THREADED RODS

This application is a continuation of application Ser. No. 08/182,330, filed Jan. 18, 1994, now abandoned.

BACKGROUND OF THE INVENTION

This invention relates generally to apparatus for cutting threaded rods to any required lengths without ruining the threads thereon, and more specifically to a machine comprising a fixed and a movable cutting bit, the latter being power driven for linear travel relative to the fixed cutting bit for cutting threaded rods. Still more specifically, the invention deals with provisions in such shearing machines for protecting the semicircular internal screw threads which are formed at least on the fixed cutting bit, from being damaged or broken when the rod is cut.

Portable, power-driven cutting machines have been known which cut threaded rods by linear travel of a movable cutting bit relative to a fixed cutting bit. An example of such cutting machine has a bladelike a punch as a movable cutting bit, and a die as a fixed cutting bit. A threaded rod is cut by punching, that is, by thrusting the punch into the cavity in the die, with the consequent removable of part of the threaded rod. Another example of cutting machine cuts threaded rods by the shearing action of the fixed and movable cutting bits.

In the punching machine, only the die has a series of semicircular internal screw threads of the same pitch as that of the thread on the rod to be cut, for mating engagement therewith. Both cutting bits of the shearing machine, on the other hand, have similar internal threads for mating engagement with the thread on the rod.

The cutting machines of both types offer the advantage that threaded rods can be readily cut to any required lengths without ruining the threads thereon, with the result that mating nuts can be smoothly turned onto such rod lengths. There has been a problem, however, that has been left unsolved with such cutting machines.

Take the punching machine for example. The internal threads on the die have so far been of the same shape and size as the thread on the rods to be cut, so that contact between them have been made only as at their flanks. Consequently, the die has had to bear the impact of cutting at the flanks of its internal threads. The force thus exerted on the die includes a component normal to the flanks, so that the threads, particularly those lying next to the die cavity, have been susceptible to fracture or breakage. As these particular threads are broken, so are the cutting edges of the die. The die with the fractured or broken threads have therefore had to be replaced.

SUMMARY OF THE INVENTION

The present invention seeks to protect the threads of the cutting bits from fracture or breakage in a most effective and least expensive way, and hence to make the useful life of the cutting bits drastically longer than heretofore, in cutting machines of the kind defined.

Briefly, the invention may be summarized as an apparatus for cutting a threaded rod having an external screw thread formed thereon with a known pitch. The apparatus comprises a fixed and a movable cutting bit, and actuator means for moving the movable cutting bit back and forth relative to the fixed cutting bit for cutting the threaded rod. At least the fixed cutting bit has a series of semicircular internal screw threads formed thereon with the same pitch as the external thread on the threaded rod for mating engagement therewith. The threads on the fixed cutting bit have a depth less than the depth of the thread on the threaded rod, and clearances are provided between the flanks of the threads on the fixed cutting bit and the flanks of the thread on the threaded rod.

Thus, according to the improved thread configurations according to the invention, the threads on the fixed cutting bit contact the thread on the threaded rod only at the roots of the former and the crests of the latter during cutting. The force exerted on the fixed cutting bit upon cutting is therefore borne totally at the roots of its internal threads, so that these threads are not to be fractured over a far more extended period of time than heretofore.

The above and other features and advantages of this invention and the manner of realizing them will become more apparent, and the invention itself will best be understood, from a study of the following description and appended claims, with reference had to the attached drawings showing the preferred embodiments of the invention.

DESCRIPTION OF THE PREFERRED EMBODIMENTS

The present invention will now be described in detail as embodied in the punching machine illustrated in FIGS. 1 and 2. Generally designated 10, the shearing machine is therein shown together with a threaded rod 12 being cut. Threaded rod 12 has a given nominal diameter, pitch and thread profile. The threaded rod 12 is shown positioned between a fixed cutting bit, herein shown as a die 14, and a movable cutting bit herein shown as a blade punch 16. The blade punch 16 is to be thrust forwardly, or to the left as viewed in FIGS. 1 and 2, into the die 14 for cutting the threaded rod 12 to any required length by punching out part of the rod by a length equal to the thickness of the punch. Both die 14 and punch 16 will be detailed later.

Figure 2:
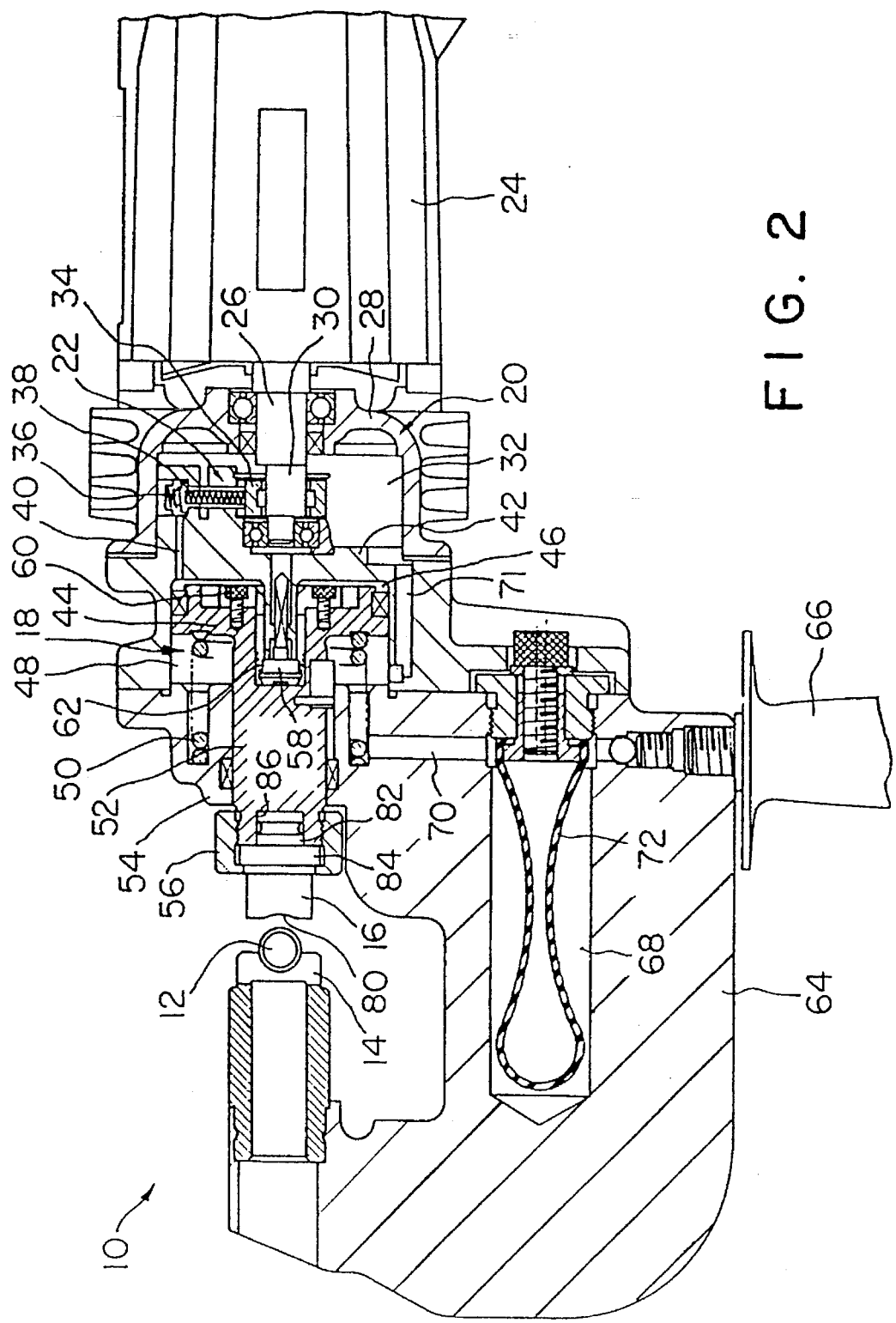
FIG. 2 is an enlarged, fragmentary, vertical section through the cutting machine of FIG. 1.

Employed for driving the blade punch 16 back and forth is a hydraulic actuator or cylinder 18, FIG. 2, of the familiar single acting, spring return type housed in a casing 20 of the shearing machine 10. The hydraulic cylinder 18 is driven by a pump 22 which also is housed in the casing 20.

The pump 22 is driven in turn by an electric motor 24 mounted to the rear end of the casing 20. The motor 24 has an armature shaft 26 rotatably extending through the rear end wall 28 of the casing 20 and terminating in an eccentric camshaft 80. This camshaft is disposed in a hydraulic fluid chamber 32 within the casing 20 which is to be filled with a hydraulic fluid such as oil. The pump 22 comprises a piston 34 rotatably mounted on the camshaft 30 for reciprocation in the fluid chamber 82, and a check valve 36, complete with a spring 38, which permits the flow of pressurized fluid from the fluid chamber into a fluid passageway 40 extending through a partition 42 within the casing 20.

Disposed just forwardly of the partition 42 is the noted hydraulic cylinder 18 having a piston 44 dividing the front part of the interior of the casing 20 into a fluid chamber 46 and a spring chamber 48. The cylinder fluid chamber 46 communicates with the pump fluid chamber 32 by way of the passageway 40. The spring chamber 48 accommodates a helical compression return spring 50. The piston 44 together with a piston rod 52 is therefore to be thrust forwardly by the pressurized fluid from the pump 22 and retracted by the return spring 50. The piston rod 52 pressure-tightly extends through, and projects outwardly of, the front wall 54 of the casing 20 and has the blade punch 16 replaceably mounted to its front end via a knurled mounting nut 56.

As shown also in FIG. 2, the piston rod 52 has a return valve 58 built into it for returning the hydraulic fluid from cylinder fluid chamber 46 back into pump fluid chamber 32. Normally closed to discommunicate the cylinder fluid chamber 48 from the pump fluid chamber 32, the return valve 58 is opened as an inturned rim 60 of the cylinder piston 44 comes into abutment against a spring 62 with the forward travel of the piston.

Figure 1:
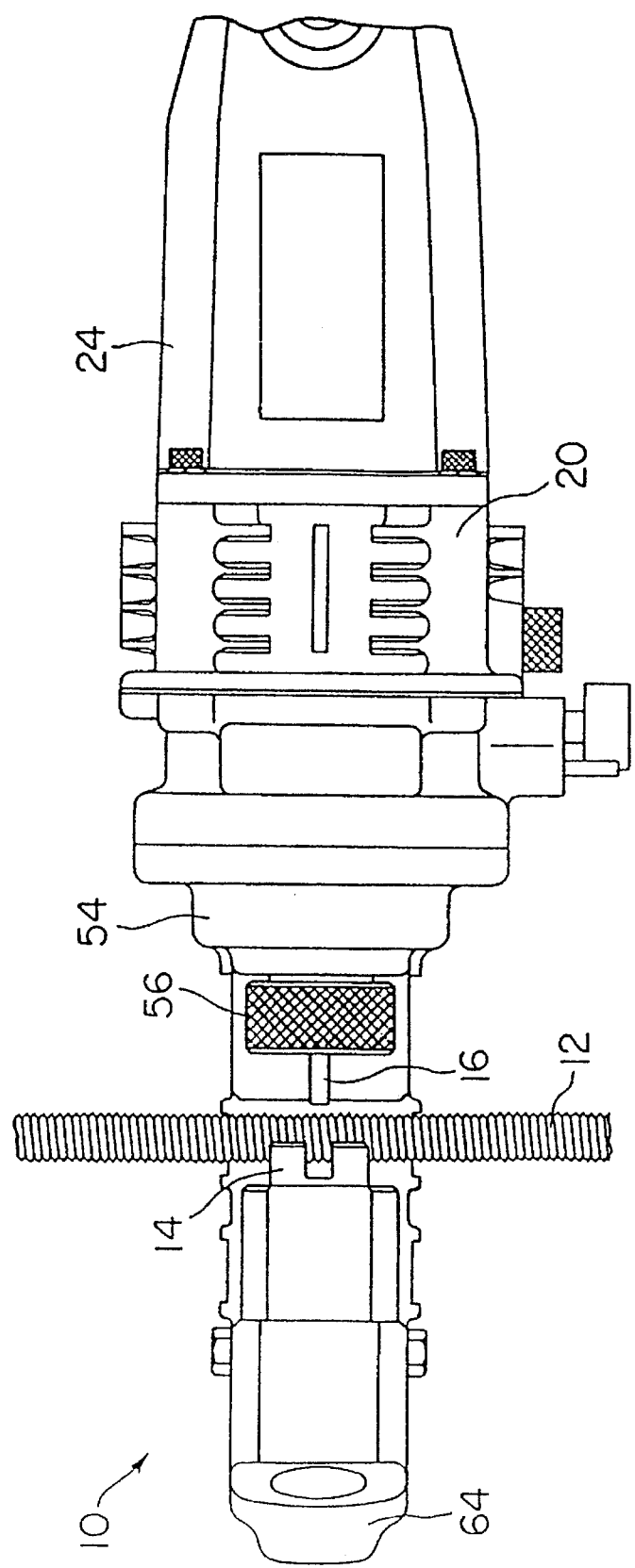
FIG. 1 is a top plan of the cutting machine embodying the principles of this invention, the machine being shown together with a threaded rod to be cut.

Both FIGS. 1 and 2 depict a jaw 64 extending forwardly from, and formed in one piece with, the front wall 54 of the casing 20. The die 14 is mounted to the front end of the jaw 64, in a position opposite the blade punch 16 on the piston rod 52. FIG. 2 reveals a cushioning chamber 68 formed in the jaw 64 in communication with the cylinder spring chamber 48 by way of a fluid passageway 70 and with the pump fluid chamber 32 by way of another fluid passageway 71. The cushioning chamber 68 accommodates an air bag 72 which is capable of elastic deformation to cushion the impact of the forward travel of the cylinder piston 44. A hand grip 66 depends from the jaw 64.

Figure 3:
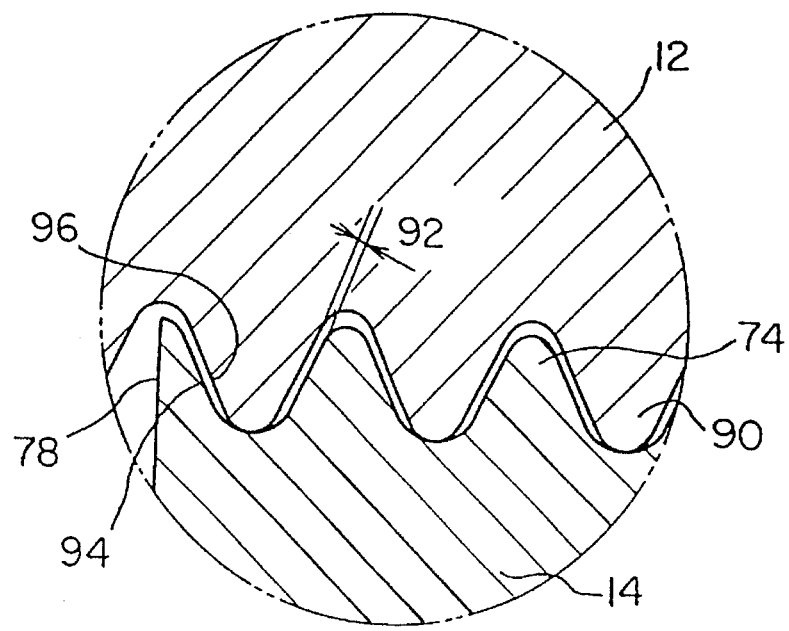
FIG. 3 is a partial section through the die of the FIG. 1 machine shown together with the threaded rod, the view being an enlargement of the part shown encircled and designated III in FIG. 4.
Figure 4:
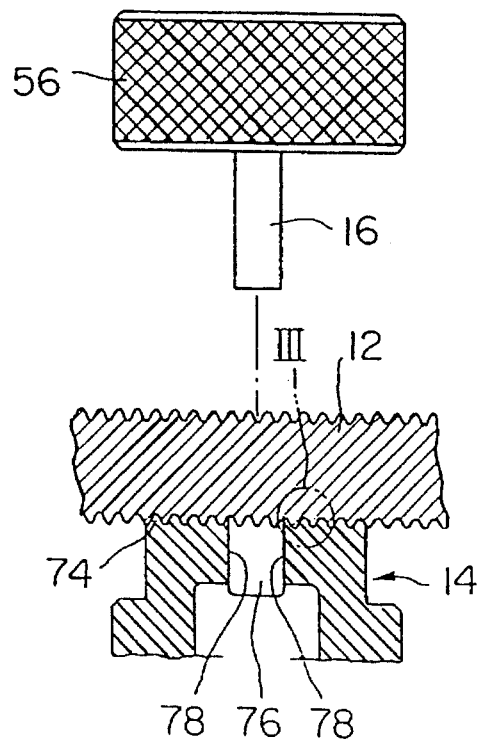
FIG. 4 is an enlarged, combined sectional and elevational view of the die and blade punch of the FIG. 1 machine shown together with the threaded rod to be cut.
Figure 5:
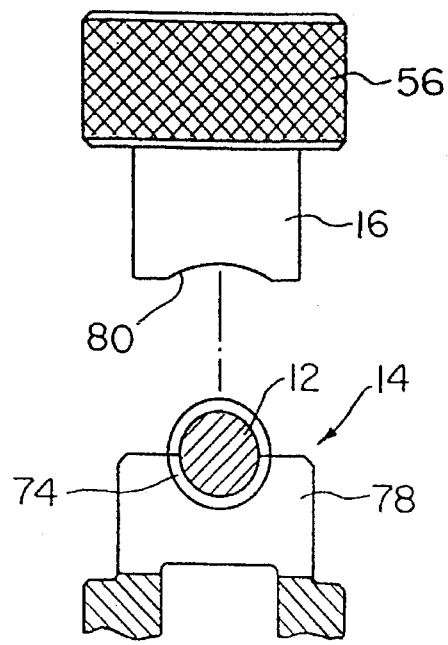
FIG. 5 shows the showing of FIG. 4 as seen from either side.

Reference is now directed to FIGS. 3–5 for a closer study of the die 14 and punch 16. The die 14 has a recess of semicircular cross secretion to carry a series of internal screw threads 74 of corresponding shape which are centered about an axis normal to the direction of travel of the blade punch 16. The pitch of the internal threads 74 is the same as that of the external thread on the rod 12 to be cut. The die 14 has a cavity 76 formed in the middle of the internal threads 74 to receive the blade punch 16. The pair of opposite die walls 78 bounding 14 the cavity 76 serve as cutting faces of the die.

The blade punch 16, on the other hand, is a flat piece of hard metal with a thickness just less than that of the die cavity 76. Formed in the front end of the blade punch 16 is a recess 80 which is curved is with a radius greater than that of the threaded rod 12.

As indicated in FIG. 2, the blade punch 16 is formed in one piece with a shank 82 and a collar 84. For mounting the blade punch 16 to the piston rod 52, the punch shank 82 is inserted in a hole 86 in the piston rod until the collar 84 seats against the front end of the piston rod. Then the knurled mounting nut 56 is turned onto the front end of the piston rod 52 so as to press the collar 84 against the piston rod.

As clearly pictured in FIG. 3, the internal threads 74 on the die 14 are of the same pitch as the external thread 90 on the rod 12. However, according to a feature of this invention, the die threads 74 have a depth less than that of the rod thread 90, providing clearances between the crests of the die threads and the roots of the rod thread. Clearances 92 are also provided between the flanks 94 of the die threads and the flanks 96 of the rod thread. Consequently, contact between threaded rod 12 and die 14 takes place only between the crests of the rod thread 90 and the roots of the die threads 74 when the threaded rod is pressed against the die by the punch 16 to be cut. No force is to be applied to the flanks 94 of the die threads 74.

In use of the cutting machine 10 of the foregoing construction, the threaded rod 12 to be cut may be held against the die 14 as shown in both FIGS. 1 and 2. It is understood that the blade punch 16 is now a held retracted, as shown also in these figures, under the force of the return spring 50 of the hydraulic cylinder 18.

Then the electric motor 24 may be switched on. With the consequent rotation of the motor armature shaft 26 together with the camshaft 30, the piston 34 of the hydraulic pump 22 will pressurize the fluid in the fluid chamber 32 for delivery to the fluid chamber 46 of the hydraulic cylinder 18 via the check valve 36 and passageway 40. The pressurized fluid on flowing into the cylinder fluid chamber 46 will force the piston 44 forwardly, or to the left as viewed in FIG. 2, against the bias of the return spring 50. Thus thrust forwardly, the blade punch 16 will cut the threaded rod 12 on being received in part in the cavity 76 in the die 14, punching out part of the rod by a length determined by the thickness of the blade punch and the width of the die cavity.

Toward the end of the forward stroke of the piston 44, the inturned piston rim 60 will engage and compress the coil spring 62 thereby unseating the return valve 58. Thereupon the pressurized fluid will flow from the cylinder fluid chamber 46 back into the pump fluid chamber 32, with the consequent retraction of the piston 44 to the FIG. 2 position together with the blade punch 16. One cycle of operation has now been completed.

As will be understood by referring again to FIG. 3, the impact of the cutting will be applied to neither crests nor roots of the internal die threads 74 by virtue of the improved thread configuration of the die with respect to that of the threaded rod. The die threads, particularly those next to the cutting faces 78 of the die 14, are therefore not to be fractured or otherwise damaged no matter how much force is required for cutting the rod.

It will also be noted from FIG. 3 that the threaded rod 12 will be cut along the root of its thread 90 and in the planes of the two opposed cutting faces 78 of the die 14 in this particular embodiment. As the die threads 74 are protected from damage as above, the thread on the rod 12 will also be not ruined on being cut, so that mating nuts will be smoothly turned onto the rod sections that have been separated.

Figure 6:
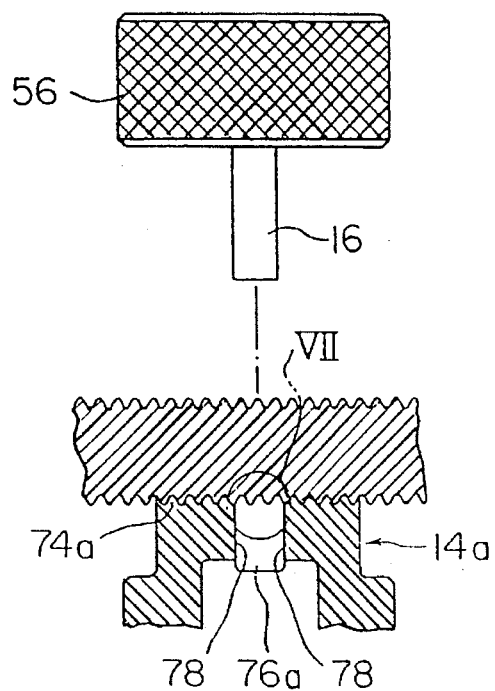
FIG. 6 is a view similar to FIG. 4 but showing an alternate embodiment of the invention.
Figure 7:
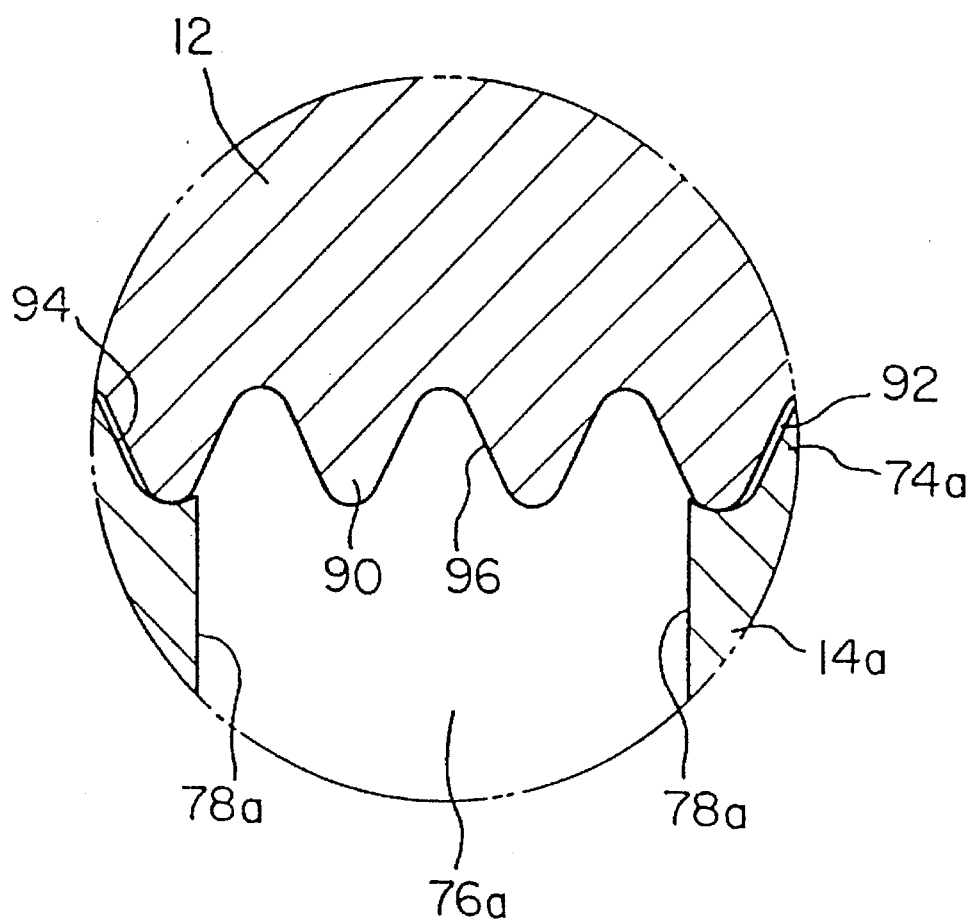
FIG. 7 is an enlargement of the part shown encircled and designated VII in FIG. 6.

In another preferred embodiment of this invention shown in FIGS. 6 and 7, the die 14a has its cavity 76a and internal threads 74a so configured that the threaded rod 12 will be cut along its crest, rather than along its root as in the foregoing embodiment. More specifically, as will be understood from FIG. 7, the pair of cutting faces 78a of the die 14 are both formed along the root of the internal die threads 74.

In this alternate cutting machine, too, the die threads 74 are so configured with respect to the rod thread 90 that contact therebetween is a made only at the roots of the die threads and the crest of the rod thread. The die 14 is therefore not to be easily fractured by the impact of cutting. The alternate cutting machine is similar in the other details of construction and operation with the cutting machine 10 of FIGS. 1–5.

Although the present invention has been shown and described hereinbefore in terms of but two preferable embodiments thereof, it is understood that a variety of modifications and alterations are possible within the broad teaching hereof. It is also understood that the invention is applicable to machines that cut threaded rods by shearing action between is a fixed and a movable cutting bit which are both threaded internally for to mating engagement with the rod. It is therefore appropriate that the invention be construed broadly and in a manner consistent with the fair meaning or proper scope of the appended claims.

What is claimed is:

1. A method for cutting a threaded rod having an external thread formed thereon with a given nominal diameter, pitch and thread profile, comprising the steps of:
   (a) engaging the threaded rod with a fixed cutting bit having a series of semicircular internal screw threads formed thereon with the same nominal diameter, thread profile and pitch as the external thread on the threaded rod for mating engagement therewith, the threads on the fixed cutting bit having a depth less than the depth of the thread on the threaded rod, there being clearances between the flanks of the threads on the fixed cutting bit and the flanks of the thread on the threaded rod, whereby only the roots of the threads on the fixed cutting bit contact the crests of the threads on the threaded rod during cutting; and
   (b) moving a movable cutting bit back and forth relative to the fixed cutting bit, the movable cutting bit coacting with the fixed cutting bit for cutting the threaded rod being held in threaded engagement with the fixed cutting bit.

2. The method of claim 1 wherein the clearances between the flanks of the threads on the fixed cutting bit and the flanks of the threads on the threaded rod are each from about 0.05 to about 0.10 times the pitch of the threads.

3. A method for cutting a threaded rod having an external thread formed thereon with a given nominal diameter, pitch and thread profile, comprising the steps of:
   (a) engaging said threaded rod with a die having a series of semicircular internal screw threads formed thereon with the same nominal diameter, thread profile and pitch as the external thread on the threaded rod for mating engagement therewith, wherein the internal threads on the die have a depth less than the depth of the thread on the threaded rod, there being clearances between the flanks of the threads on the die and the flanks of the thread on the threaded rod, whereby only the roots of the threads on the die contact the crests of the threads on the threaded rod during cutting, the die also having a recess formed in the middle of the series of internal screw threads; and
   (b) moving a punch adapted to be received in the cavity in the die into and out of the cavity in the die for cutting the threaded rod being held in threaded engagement with the die.

4. The method of claim 3, wherein the clearances between the flanks of the threads on the die and the flanks of the threads on the threaded rod are each from about 0.05 to about 0.10 times the pitch of the threads.

5. A method for cutting a threaded rod having an external thread formed thereon with a given nominal diameter, pitch and thread profile, comprising the steps of:
   (a) engaging said threaded rod with a fixed cutting bit having a series of semicircular internal screw threads formed thereon with the same nominal diameter, thread profile and pitch as the external thread on the threaded rod for mating engagement therewith, the threads on the fixed cutting bit having a depth less than the depth of the thread on the threaded rod, there being clearances between the flanks of the threads on the fixed cutting bit and the flanks of the thread on the threaded rod, whereby only the roots of the threads on the fixed cutting bit contact the crests of the threads on the threaded rod during cutting; and
   (b) moving a movable cutting bit, having a series of semicircular internal screw threads formed thereon with the same nominal diameter, thread profile and pitch as the external thread on the threaded rod for mating engagement therewith, the threads on the movable cutting bit having a depth less than the depth of the thread on the threaded rod, there being clearances between the flanks of the threads on the movable cutting bit and the flanks of the thread on the threaded rod, whereby only the roots of the threads on the movable cutting bit contact the crests of the threads on the threaded rod during cutting, back and forth relative to the fixed cutting bit, the movable bit coacting with the fixed cutting bit for cutting the threaded rod being held in threaded engagement with the fixed cutting bits.

* * * * *